US012684185B2

(12) United States Patent
Kennedy et al.

(10) Patent No.: US 12,684,185 B2
(45) Date of Patent: Jul. 14, 2026

(54) CONTENT MARKETPLACE AND CUSTOMIZATION OF CONTENT ACQUISITION

(71) Applicant: Comcast Cable Communications, LLC, Philadelphia, PA (US)

(72) Inventors: Chris Kennedy, Highlands Ranch, CO (US); Rick Gasloli, Downingtown, PA (US); Amit Garg, Delran, NJ (US); Richard Woundy, North Reading, MA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/734,319

(22) Filed: Jan. 4, 2013

(65) Prior Publication Data

US 2014/0196064 A1 Jul. 10, 2014

(51) Int. Cl.
| | |
|---|---|
| *H04N 21/2543* | (2011.01) |
| *H04N 21/2668* | (2011.01) |
| *H04N 21/472* | (2011.01) |

(52) U.S. Cl.
CPC ... *H04N 21/25435* (2013.01); *H04N 21/2668* (2013.01); *H04N 21/472* (2013.01)

(58) Field of Classification Search
CPC ......... H04N 21/25435; H04N 21/2668; H04N 21/472
See application file for complete search history.

(56) References Cited

U.S. PATENT DOCUMENTS

| | | | | |
|---|---|---|---|---|
| 6,466,671 | B1 * | 10/2002 | Maillard ............... | G06F 9/4843 |
| | | | | 380/227 |
| 7,526,788 | B2 * | 4/2009 | Rodriguez ............... | H04N 7/08 |
| | | | | 725/86 |
| 8,122,128 | B2 | 2/2012 | Burke, II et al. | |
| 8,234,302 | B1 | 7/2012 | Goodwin et al. | |
| 2003/0005452 | A1 * | 1/2003 | Rodriguez ....... | H04N 21/23439 |
| | | | | 725/86 |
| 2003/0149974 | A1 * | 8/2003 | Diehl ............................. | 725/25 |
| 2004/0030643 | A1 | 2/2004 | Madison et al. | |
| 2004/0162787 | A1 | 8/2004 | Madison et al. | |
| 2005/0119977 | A1 * | 6/2005 | Raciborski ............ | G06F 21/105 |
| | | | | 705/59 |
| 2006/0014535 | A1 * | 1/2006 | Walker ............. | H04N 21/47815 |
| | | | | 455/433 |
| 2006/0123484 | A1 * | 6/2006 | Babic ...................... | G06F 21/10 |
| | | | | 726/26 |
| 2007/0038931 | A1 * | 2/2007 | Allaire ............... | G06Q 30/0601 |
| | | | | 715/208 |
| 2007/0061834 | A1 * | 3/2007 | Guillorit ............... | G06Q 10/10 |
| | | | | 725/23 |
| 2007/0203843 | A1 * | 8/2007 | Tarkkala et al. ................. | 705/54 |
| 2007/0204285 | A1 * | 8/2007 | Louw ................ | G06F 17/30867 |
| | | | | 725/14 |

(Continued)

*Primary Examiner* — Nicholas T Corbo
(74) *Attorney, Agent, or Firm* — Ballard Spahr LLP

(57) ABSTRACT

Aspects of the disclosure relate to customization of content acquisition in a content marketplace. Such customization can provide access that is user-specific. In one aspect, the content marketplace can permit a consumer to inspect (e.g., browse or search) and acquire content offerings by customizing the user's access package using one or more user devices and according to various price propositions.

20 Claims, 6 Drawing Sheets

400

(56) References Cited

U.S. PATENT DOCUMENTS

2009/0083780 A1* 3/2009 Beyabani ........... H04N 7/17318
                                                      725/14
2009/0182670 A1* 7/2009 Farrugia ................ H04N 7/165
                                                      705/51
2010/0162321 A1* 6/2010 Bradley ............. H04N 5/44543
                                                      725/56
2010/0263003 A1* 10/2010 Gupta ................ H04N 21/6125
                                                      348/565
2012/0216236 A1* 8/2012 Robinson et al. ............ 725/118
2012/0323772 A1* 12/2012 Michael ................. G06Q 40/00
                                                      705/39
2013/0091582 A1* 4/2013 Chen .................. H04N 21/8358
                                                      726/26
2013/0263174 A1* 10/2013 Chaudhari ....... H04N 21/25435
                                                      725/28
2013/0298151 A1* 11/2013 Leske et al. .................... 725/25
2014/0075582 A1* 3/2014 Hierro .................. H04L 63/123
                                                      726/30

* cited by examiner

400

601

Tune to a non-subscribed content offering

602

Receive content associated with the non-authorized content offering at a predetermined non-authorized rendering quality being lower than an available rendering quality provided for an authorized content offering

CONTENT MARKETPLACE AND CUSTOMIZATION OF CONTENT ACQUISITION

BACKGROUND

With the proliferation of content available in the marketplace, along with increasing content price, users may pay for content which they seldom or never consume. Service providers typically manage content offerings (e.g., channel line-ups) in bulk packages or tiers, such as sports tiers, news tiers, and movie tiers. Yet, such bulk packages afford limited customization for users, and, from the perspective of the provider, lack of customization may be insufficient to effectively engage the users.

SUMMARY

It is to be understood that both the following general description and the following detailed description are exemplary and explanatory only and are not restrictive. This summary is illustrative and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

The disclosure relates, in one aspect, to customization of content acquisition in a content marketplace. Customization can provide access—e.g., programming availability and price positions—that is user-specific. In one aspect, the content marketplace can permit a consumer to inspect (e.g., browse or search) and acquire content offerings, such as linear programming, on-demand, time shifted, and/or pre-recorded content, by customizing the user's access or access package using one or more user devices and according to various price positions. Access can comprise, for example, subscribing, renting, and/or purchasing one or more content offerings.

In an aspect, provided are methods and systems comprising receiving, at a network node, data indicative of a first selection of a non-authorized content offering, the non-authorized content offering being selected according to an access option, and generating, at the network node, an access configuration of one or more selected content offerings based at least on the first selection of the non-authorized content offering, the access configuration having data indicative of at least the non-authorized content offering for a fixed time interval.

In a further aspect, provided are methods and systems comprising tuning, at a computing device, to a non-authorized content offering and receiving, at the computing device, content associated with the non-authorized content offering at a predetermined non-authorized rendering quality lower than an available rendering quality provided for an authorized content offering.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
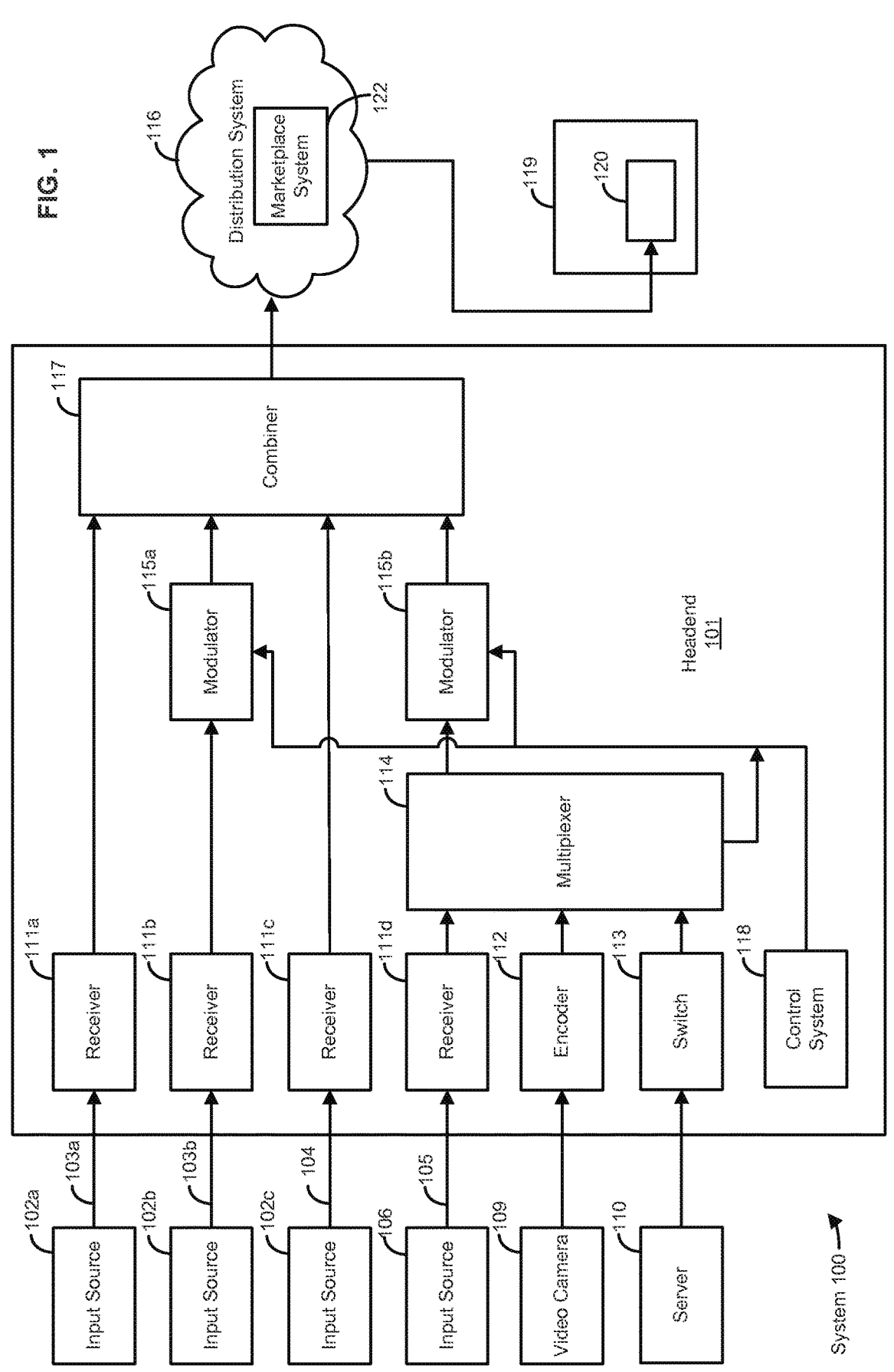
FIG. 1 is an example operating environment in accordance one or more aspects of the disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The subject disclosure recognizes and addresses, in one aspect, that many users of network-delivered content are likely to desire a single or small number of content offerings (e.g., channels, television shows, movies, etc. . . . ) above the basic service. While users may be interested in specific single content offerings, the users will generally resist acquiring such offering because such offerings are generally unavailable except in a package with other content offerings. Similarly, users are also likely to desire specific content offerings, such as a particular television episode or series, rather than a subscription to one or more channels. Further, users are likely to desire access to one or more channels on a flexible time basis; for example, a number of days, weeks, or months. In an aspect, a user can be provided with an entirely transactional content consumption experience. In addition, the disclosure recognizes and addresses the issue of users being able to keep up with the ever-increasing access costs to obtain a package that contains a few desired channels. Access can comprise, for example, subscribing, renting, and/or purchasing one or more content offerings.

As described in greater detail below, in one aspect, provided are methods and systems that enable a user to customize access to content offerings. The methods and systems can comprise a marketplace system that enables a user to browse/search and add/delete content offerings to the user's access package using one or more user devices. In an aspect, a listing of available content offerings can be provided to the user that comprises both authorized and unauthorized content offerings. In an aspect, content offerings can be added to a basic package of content offerings. The basic package of content offerings can comprise a minimum set of content offerings to which the user must subscribe. The user can interact with a user device, such as a computer or a set-top box, to access a user interface. A user can interact with the user interface either through a website or through a channel guide to add and delete content offerings. The methods and systems provided apply to users that pay for content offerings monthly and those that utilize a prepaid system.

In an aspect, a user may be authorized to watch only a few channels, or no channels, but could choose to have service active for some minimum monthly recurring charge (MRC). When a user tunes to a channel for which the user is not authorized, the user can be presented with a user interface element (such as a pop-up window, button, and the like) offering the user one or more content offering options such as adding the channel to his lineup, authorization for a day (or other time period, such as week, month, etc. . . . ), and/or authorization for the current program (or program series) only. In an aspect, each content offering option can comprise the same or a different pricing model. In an aspect, the user can be provided with a low-bitrate, low resolution tile of content on a small fraction of the screen for a certain period of time. Only after the user pays and/or is authorized for that content, will the content appear on the full screen at full resolution. If the user chooses no option, the low-bitrate, low resolution tile can be configured to not display after a predetermined timeout period.

The user can select an option and the content offering can be provided to the user. The user device can interact with a marketplace system to obtain content offering information, pricing models, and timeout information. The marketplace system can also enable a user to add certain monetary amounts to a prepaid account to enable access to desired content offerings. The methods and systems provided thus allow a user to select and watch any content offering, but also to manage the monetary amount spent on the same. For example, a user with a vacation home may desire to maintain service active for a minimum MRC, and by maintaining a positive balance in his account, the user can have immediate access to any additional content offerings when desired. The methods and systems are applicable to both QAM-based and IP-based distribution of content, such as broadcast video.

In certain aspects, the content offering provider can adjust the pricing of content offerings. The pricing can be adjusted manually or automatically. Automatic pricing adjustment can be based on the type of content offering, the desired duration of access (e.g., day, week, month), the popularity of the content offering, and/or time. For example, a content offering for a pay-per-view event can go up in price as the day of the event draws closer.

FIG. 1 illustrates various aspects of an exemplary system in which the present methods and systems can operate. The present disclosure relates to a marketplace that enables users to selectively modify the content offerings that can be consumed. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items. The signals provided by the content sources can include, for example, a single content item or a multiplex that includes several content items. In an aspect, the central location 101 can create and/or receive application, such as interactive applications. Such applications can be related to particular content.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators, 115a and 115b, for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. In an aspect, distribution system 116 can be the Internet. There can be a multitude of user locations connected to distribution system 116. At user location 119, a user device 120 can decode, if needed, the signals for display, such as on a television set (TV) or a computer monitor. Those skilled in the art will appreciate that the signal can be decoded in a variety of equipment, and thus user device 120 can comprise one or more of an HCT, a computer, a smart phone, a tablet, a TV, a monitor, satellite dish, and the like. In an exemplary aspect, the methods and systems disclosed can be partially or wholly located within, or performed on, one or more user devices 120. In an aspect, user location 119 is not fixed. By way of example, a user can receive content from the distribution system 116 on a mobile user device such as a laptop computer. PDA, smartphone. GPS, vehicle entertainment system, portable media player, and the like.

In an exemplary embodiment, the methods and systems disclosed can be located within one or more marketplace systems 122 within distribution system 116. The marketplace system 122 can be configured to interact with the user device 120. The marketplace system 122 can be accessed through an API to permit configuration of prices, packages, and the like. Similarly, one or more algorithms can be used to determine pricing which can utilize demand, capacity, bundled discounts, loyalty discounts, special promotions, and the like. In one aspect, the marketplace systems 122 can permit content providers to establish a price point (or price proposition) for content based on market demand and time value of content, e.g. games. In this scenario, content access can be as granular as a 30 minute episode and does not have to be a subscription of the channel for a month. In addition or in the alternative, the price point can also change based on bandwidth availability. The marketplace systems 122 also can provide a prepaid service in which users are charged $X per month to maintain a connection and then can choose to pay for content they want to watch without being tied to any content approval, channel subscription, and the like. In one aspect, the marketplace systems 122 can permit viewership of non-authorized content offerings and can limit the viewership to a certain time limit, such as no more than 30 minutes in a day, no more than 5 minutes in an hour and can also have blackouts. In another aspect, the marketplace systems 122 can permit users to elect to access a monthly subscription, but also can permit users to only access a specific content offering from the monthly subscription (e.g 30 minute content offering or add a limited duration subscription such as 1-day, 1-week, or a monthly subscription at different rates). In an aspect, the marketplace systems 122 can perform an access authorization function when the user device 120 accesses a new program on a currently viewed channel or when the user device 120 switches channels, to confirm that the user device 120 is authorized to access the content.

When a user accesses a content offering that is not yet authorized for consumption, the user device 120 can display the content offering with pre-rendered settings (low resolution, tile, timeout, etc.) and transmit a message to the marketplace system 122. The marketplace system 122 can then instruct the user device 120 to display an access message to the user with appropriate data on pricing, timing, and the like. In the event the user has a pre-paid account, the marketplace system 122 can provide the balance available and/or an insufficient balance message. The marketplace system 122 can also allow users to increase the account balance through the user device 120. In the event the user elects to access the content offering, the user device 120 can be authorized to provide the content offering.

Figure 2:
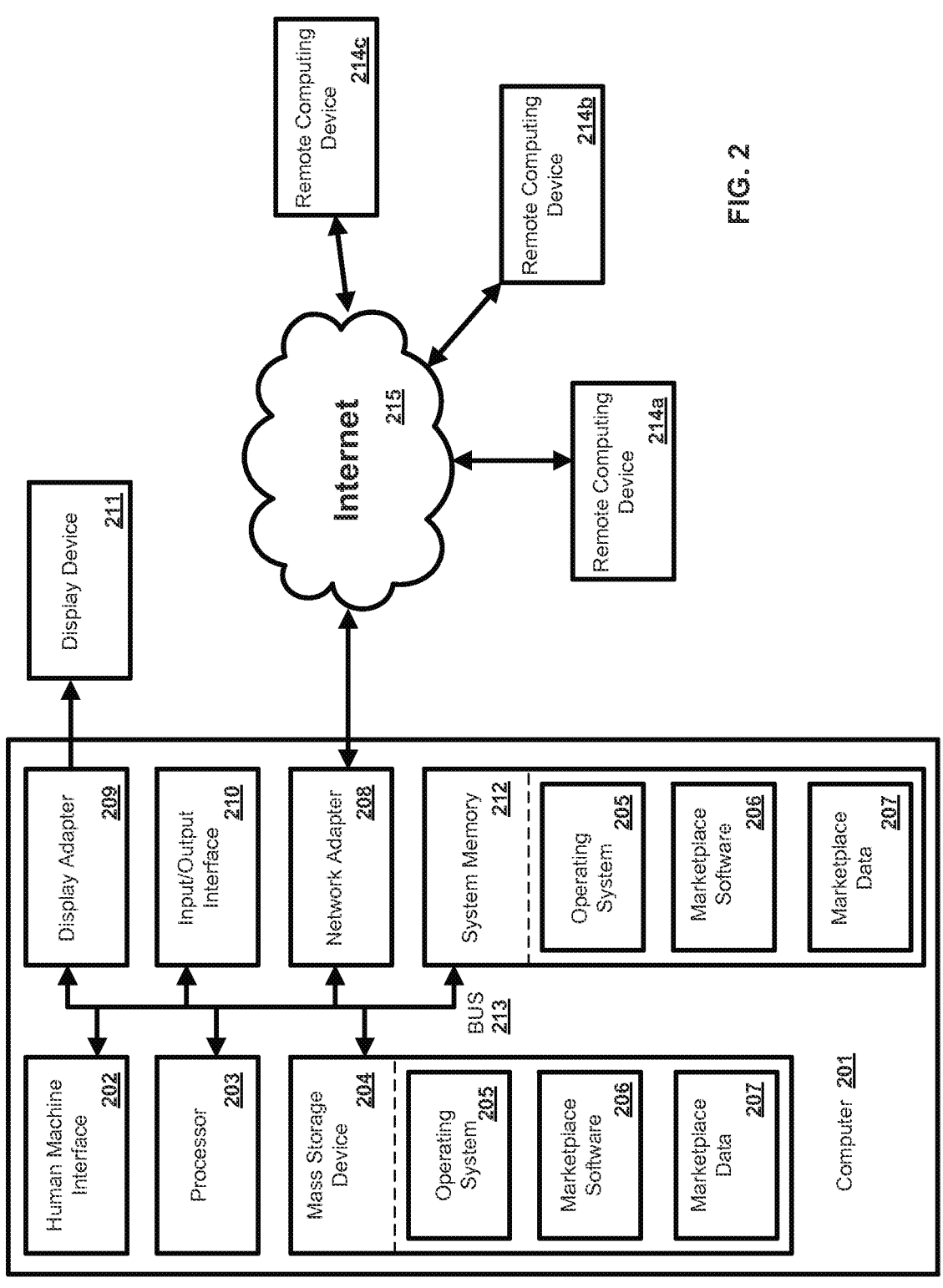
FIG. 2 is another example operating environment in accordance one or more aspects of the disclosure.

In an exemplary aspect, the methods and systems can be implemented on a computing device 201 as illustrated in FIG. 2 and described below. By way of example, marketplace system 122 of FIG. 1 can be one or more computing devices as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, marketplace software 206, marketplace data 207, a network adapter 208, system memory 212, an Input/Output Interface 210, a display adapter 209, a display device 211, and a human machine interface 202, can be contained within one or more remote computing devices 214*a,b,c* at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as marketplace data 207 and/or program modules such as operating system 205 and marketplace software 206 that are immediately accessible to and/or are presently operated on by the processing unit 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards. CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and marketplace software 206. Each of the operating system 205 and marketplace software 206 (or some combination thereof) can comprise elements of the programming and the marketplace software 206. Marketplace data 207 can also be stored on the mass storage device 204. Marketplace data 207 can be stored in any of one or more databases known in the art. Examples of such databases comprise, DB2®, Microsoft®, Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like. The display 211 and computer 201 can be part of one device, or separate devices.

The computer 201 can operate in a networked environment using logical connections to one or more remote computing devices 214a,b,c. By way of example, a remote computing device can be a personal computer, portable computer, smartphone, a server, a router, a network computer, a peer device or other common network node, and so on. Logical connections between the computer 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of marketplace software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
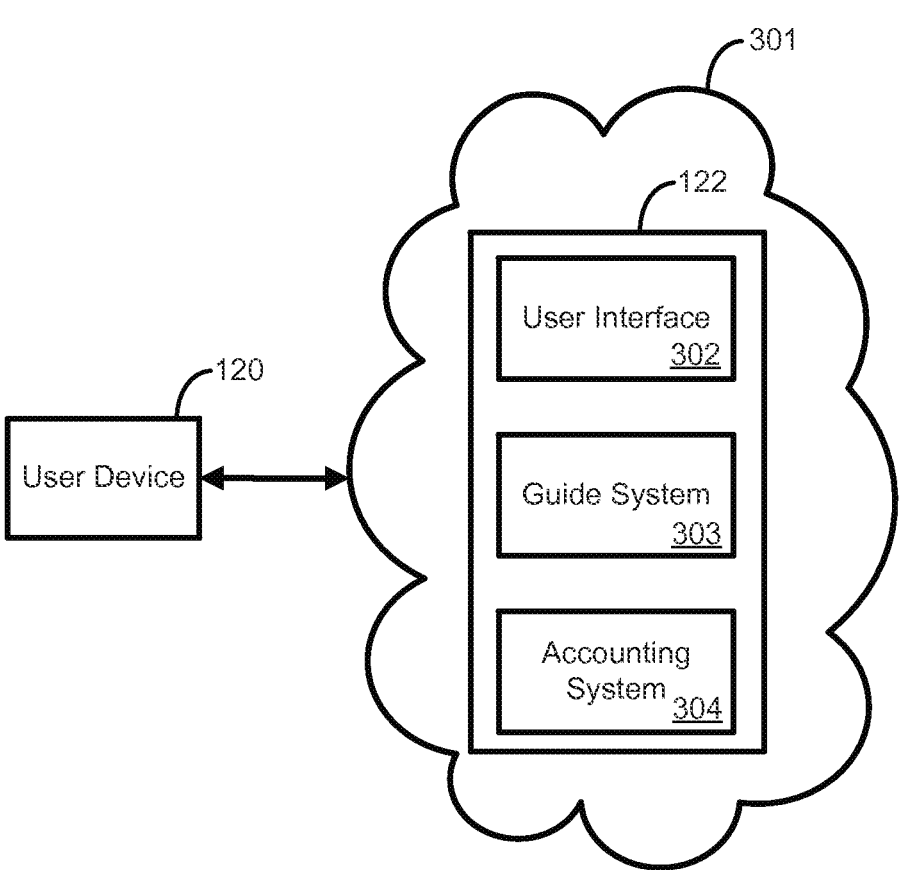
FIG. 3 is another example operating environment in accordance one or more aspects of the disclosure.

FIG. 3 illustrates an exemplary operating environment. User device 120 can be any type of device capable of providing content to a user (e.g. audio, video, data, and combination thereof). For example, user device 120 can be a computer, a set-top box, a smart phone, a tablet, and the like. User device 120 and marketplace system 122 can be in communication with network 301. Network 301 can be any type of network or combination of networks using any type of protocol or combination of protocols, including, for example, LANS, WANS, and the like. In an aspect, network 301 can be the Internet. The marketplace system 122 can comprise a user interface 302 to enable a user to browse/search and add/delete content offerings to the user's access package. In an aspect, the marketplace system 122 can comprise a web server and the user interface 302 can comprise a user-facing website. In another aspect, the user interface 302 can comprise a channel guide. The marketplace system 122 can comprise a guide system 303 configured to create custom channel guides for rendering on the user device 120. The marketplace system 122 can comprise an accounting system 304 to assess changes to a user's account and coordinate appropriate billing.

In an aspect, guide system 303 can comprise a program guide database for storing program guide information, such as television program listings, pay-per-view ordering information, television program promotional information, and the like. The guide system 303 enables users to navigate scheduling information menus interactively, selecting and discovering programming by time, title, station, or genre using an input device, such as a keypad, computer keyboard, or TV remote control. The guide system 303 also enables a user to selectively access (e.g., subscribe, rent, and/or purchase) one or more content offerings through an interactive program guide. The guide system 303 can comprise various layers of authorization. For example, when a user selects content to consume, an authorization engine can verify whether the user has access for the current period and can also perform a validation operation before the start of the next program on the same channel.

In an aspect, accounting system 304 can be configured for storing and maintaining account details (such as billing and access details) of one of more users. In an aspect, the accounting system 304 accounting system can cause a monetary amount to be debited every time a user accesses content or a renewal window comes up for content that has auto-renewal.

Figure 4:
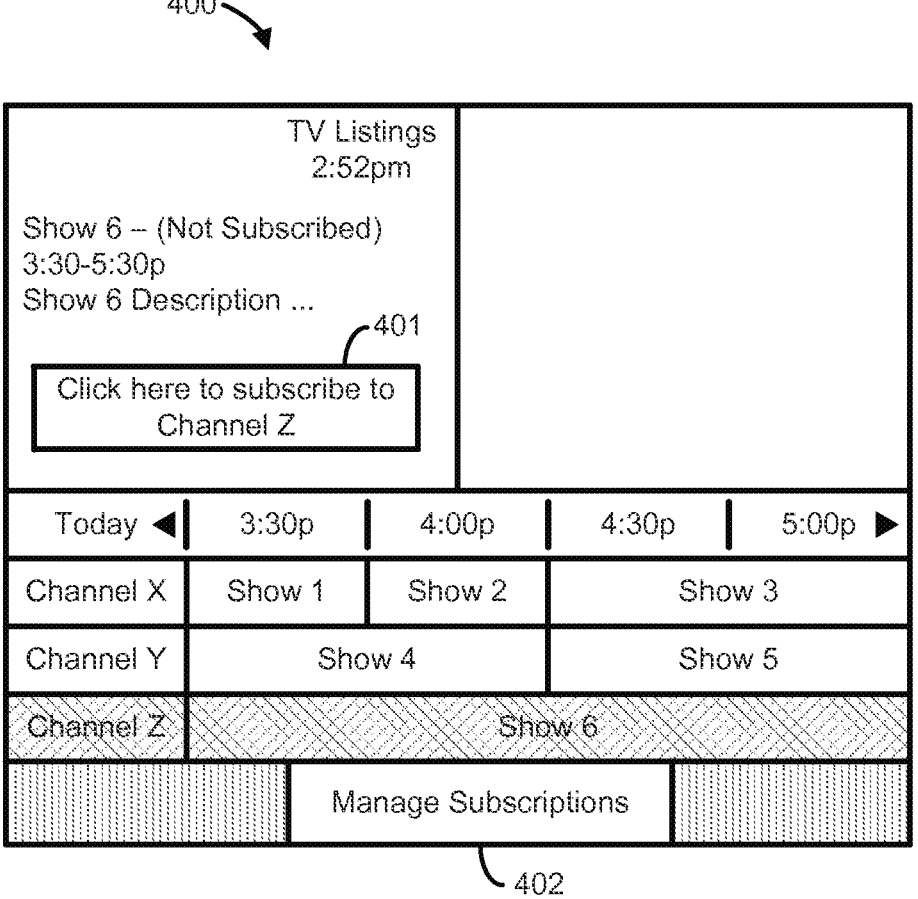
FIG. 4 is an example user interface in accordance one or more aspects of the disclosure.

FIG. 4 illustrates an exemplary user interface 400 that enables a user to add a content offering to the user's access package. As shown, Channel X and Channel Y are part of the user's access package and the content of both channels can be viewed by the user. Channel Z is greyed out, informing the user that Channel Z is not part of the user's access package. Alternatively, content offerings not selected can be removed from a primary portion of the guide. The users can be presented with an option to display non-authorized content as greyed out or not at all. Upon selecting Channel Z, the user can be presented with a description of the current content offering on Channel Z; in this case, Show 6 in the upper left portion of the user interface 400. In an aspect, the user can be presented with a low quality view of the content offering in the upper right portion of user interface 400. The user can be presented with a button 401, or other user interface element, that can initiate the process for adding Channel Z and/or Show 6 to the user's access package. In an aspect, upon interacting with button 401, the user can be provided with various options (e.g, pricing, timing, etc.) for accessing the content offering.

In another aspect, a user can engage button 402, or other user interface element, to manage the current content offerings the user can access. For example, the user can be provided with a list of available content offerings that can be sorted by price and/or relevance. For example, if the user already subscribes to six sports channels, the list can place similar channels near the top. In another aspect, the user can search for content. Any method for determining relevance can be used. In a further example, from a price perspective, the selection of a specific channel can alter the price of other channels. For example, ESPN2 might cost $5 per month but once ESPN is authorized, the price for ESPN2 could be lowered to $1 per month.

In an aspect, once a user has selected one or more content offerings to add to the user's access package, the user can identify specific user devices that are authorized to access the content offerings. Once the selected content offerings have been associated with the user's access package, a custom guide can be generated to display the new content offerings to the user.

In another aspect, the methods and systems can enable a user to change channel lineups during the month. The accounting system can track the number of channel lineup changes and limit the number. In another example, if a user signs up for the 10 channels as part of a $10 package, the user can set the 10 channels once at the beginning of the month and then have 10 channel lineup changes over the course of the month, with additional channel lineup changes costing an incremental amount. If the user does not set all channels at the beginning of the month—for instance if the user only set 5 channels at the beginning of the month—the channel providers can be paid for the fraction of the month that the user actually consumed the channels.

Figure 5:
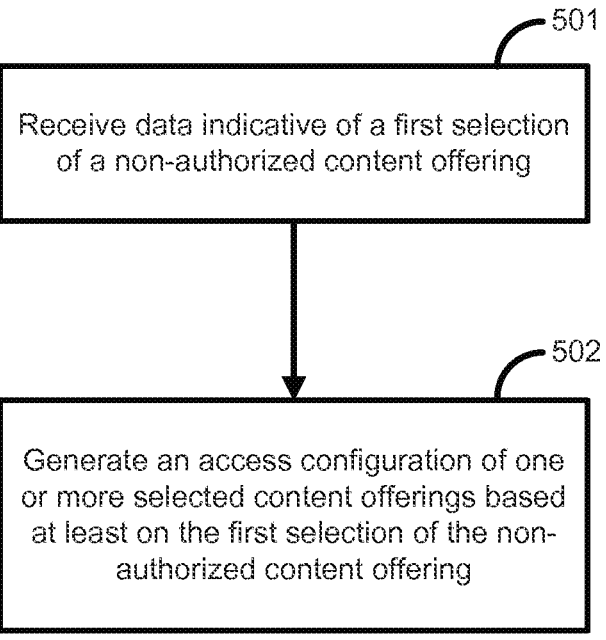
FIG. 5 is a flowchart illustrating an example method in accordance with one or more aspects of the disclosure.

In an aspect, illustrated in FIG. 5, provided are methods and systems comprising receiving, at a network node, data indicative of a first selection of a non-authorized content offering, the non-authorized content offering being selected according to an access option at 501 and generating, at the network node, an access configuration of one or more selected content offerings based at least on the first selection of the non-authorized content offering, the access configuration having data indicative of at least the non-authorized content offering at 502. In an aspect, generating can comprise configuring the non-authorized content offering as a currently-authorized content offering. Currently-authorized content offerings can comprise, for example, content offerings that a user presently has access to under, for example, a limited or unlimited subscription, a rental basis, a purchase, and the like. In another aspect, generating can comprise generating a list sorted according to at least one of a price point of a content offering or a relevance of the content offering.

The methods can further comprise transmitting, by the network node, data indicative of the access configuration to a computing device configured to deliver content associated with a content offering indicating the access configuration. In another aspect, the methods can further comprise transmitting, by the network node, data indicative of an available balance of a pre-paid account having remaining funds, as paid content is accessed, based at least on an access term of the pre-paid account. Paid content can be content paid for by a user, for example, for an access term (access window). An access term can be a window of time for which the user will have access to a particular content offering (such as a linear channel or other content). The access term can vary from a current episode to a day, a week or a month. The methods can still further comprise transmitting, by the network node, data indicative of an insufficient balance in a pre-paid account having insufficient funds, as paid content is accessed, based at least on an access term of the pre-paid account.

The methods can further comprise generating, at the network node, prior to receiving data indicative of a first selection of a non-authorized content offering, at least one access option for acquisition of content associated with at least one non-authorized content offering of a plurality of content offerings. The methods can further comprise transmitting to a computing device, by the network node, data indicative of the at least one access option, the computing device being configured to transmit data indicative of content associated with a content offering. Generating the at least one access option can comprise generating a current price for acquisition of the content associated with the at least one non-authorized content offering. In an aspect, generating the at least one access option can comprise generating an updated price for acquisition of content associated with the at least one non-authorized content offering when the non-authorized content offering is configured as a currently-authorized content offering.

In response to the first selection of the non-authorized content offering, generating the access option can comprise generating a first updated price for acquisition of the content associated with the non-authorized content offering, and generating a second updated price for acquisition of content associated with at least one related non-authorized content offering.

The methods can further comprise monitoring, at the network node, a second selection of one or more content offerings during a predetermined period, the second selection comprising the first selection of the non-authorized content offering or selection of at least one currently-authorized content offering. In an aspect, the methods can further comprise invalidating, at the network node, a selection of a content offering of the one or more content offerings in response to a number of cumulative selections made during the predetermined period exceeding a threshold. The methods can still further comprise assessing, by the network node, a fee for selection of a content offering of the one or more content offerings in response to a number of cumulative selections made during the predetermined period exceeding a threshold. For example, a user can pay for one content offering that may result in a change in price of a number of other content offerings. If a user accesses a second content offering in a group, said access can cause the lowering (or raising) of prices of other content offerings in the group.

Figure 6:
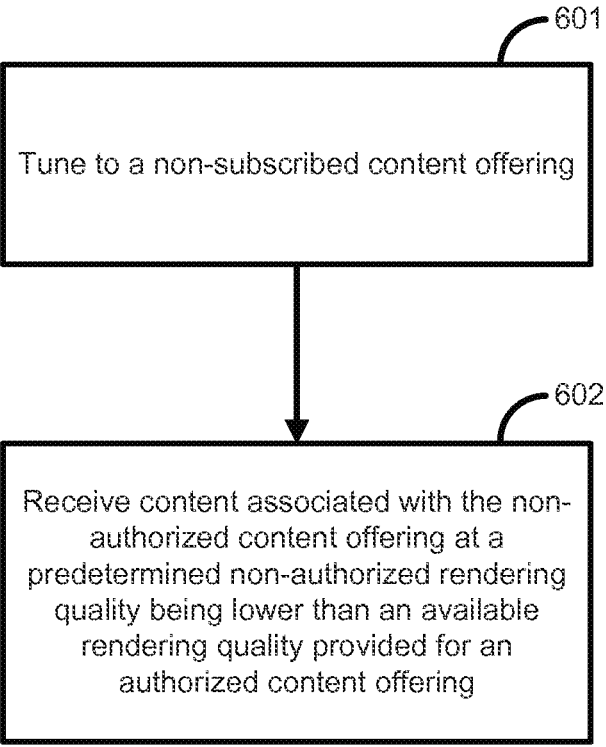
FIG. 6 is another flowchart illustrating an example method in accordance with one or more aspects of the disclosure.

In an aspect, illustrated in FIG. 6, provided are methods and systems comprising tuning, at a computing device, to a non-authorized content offering at 601 and receiving, at the computing device, content associated with the non-authorized content offering at a predetermined non-authorized rendering quality, that quality being lower than an available rendering quality provided for an authorized content offering at 602.

The methods can further comprise transmitting, to a network node, data indicative of the non-authorized content offering, wherein the non-authorized content offering is one of a plurality of content offerings being available for access via a recurrent-payment account or a pre-paid account. In an aspect, the methods can further comprise, in response to transmitting data indicative of the non-authorized content offering, receiving data indicative of an access option for acquisition of the content associated with the non-authorized content offering. The methods can further comprise receiving data indicative of an available balance of the pre-paid account as the paid content is accessed using the pre-paid account and funds remaining therein. In another aspect, the methods can further comprise receiving data indicative of an insufficient balance in a pre-paid account as the paid content is accessed using the pre-paid account and funds are unavailable therein. The methods can still further comprise receiving signaling indicative of an instruction to transmit data indicative of the access option to a display unit in response to the transmitting.

In an aspect, the methods can further comprise, in response to tuning to a non-authorized content offering, transmitting, to a display unit, data indicative of the access option and a portion of the received content associated with the non-authorized content offering, the access option having a specific price point. Transmitting to a display unit data indicative of the access option and a portion of the received content associated with the non-authorized content offering can comprise transmitting the data to the display unit for a predetermined period. In another aspect, transmitting to a display unit data indicative of the access option and a portion of the received content associated with the non-authorized content offering can comprise transmitting the data at a low-bit rate to the display unit.

In another aspect, transmitting to a display unit data indicative of the access option and a portion of the received content associated with the non-authorized content offering can comprise formatting the data for rendition in a plurality of pixels spanning a portion of a display area in the display unit. In a further aspect, transmitting to a display unit data indicative of the access option and a portion of the received content associated with the non-authorized content offering can further comprise transmitting the formatted data to the display unit.

The methods can further comprise receiving data indicative of acceptance of the access option of the non-authorized content offering. The methods can further comprise configuring the non-authorized content offering as an authorized content offering in response to the access of the non-authorized content offering.

The methods can further comprise blocking at least the portion of the received content for a predetermined second period associated with scheduled delivery of the portion of the received content.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
receiving, by a device, data indicative of a selection of a content item;
determining, based on the data indicative of the selection of the content item, that user access rights are not associated with access to the content item;
causing, based on the selection of the content item, while the user access rights are not associated with access to the content item, first output of the content item, via a user interface, at a first quality that is lower than an available second quality associated with access to the content item;
determining, based on one or more parameters associated with an access option for accessing the content item, a price of the access option;
receiving, during the first output of the content item, based on data indicative of the price of the access option, data indicative of a selection, via the user interface, of the access option;
causing, based on the selection of the access option, the user access rights to be associated with access to the content item; and
causing, based on the user access rights being associated with access to the content item, second output of the content item, via the user interface, at the second quality.

2. The method of claim 1, further comprising: causing output of a list of content items at a user device, wherein the list is sorted based on one or more of a price point or a relevance.

3. The method of claim 1, further comprising:
determining, based on an access term of a pre-paid account associated with the user access rights, an available balance of the pre-paid account; and
sending data indicative of the available balance of the pre-paid account.

4. The method of claim 1, further comprising:
determining, based on an access term of a pre-paid account associated with the user access rights, an available balance of the pre-paid account;
determining, based on the available balance being insufficient to access the content item, that the pre-paid account satisfies a threshold; and
sending data indicative of the pre-paid account having insufficient funds.

5. The method of claim 1, wherein causing the second output of the content item comprises sending, by the device to a user device, the content item.

6. The method of claim 1, further comprising:
receiving a second selection of one or more additional content items;
determining that the second selection of the one or more additional content items satisfies a threshold; and
invalidating, based on the threshold being satisfied, a selection of an additional content item of the one or more additional content items.

7. The method of claim 6, wherein the threshold comprises a number of selections of the one or more additional content items that are not associated with the user access rights during a time period.

8. The method of claim 6, further comprising: determining, based on the threshold being satisfied, a fee for the second selection of the one or more additional content items.

9. The method of claim 1, wherein the one or more parameters comprise one or more of a type of content offering, a duration of access, a popularity of the content offering, a bandwidth availability, or a previous selection of the access option.

10. The method of claim 1, further comprising: determining a discounted price for accessing an additional content item associated with the content item.

11. An apparatus comprising:
one or more processors; and
a memory storing processor-executable instructions that, when executed by the one or more processors, cause the apparatus to:
receive data indicative of a selection of a content item;
determine, based on the data indicative of the selection of the content item, that user access rights are not associated with access to the content item;
cause, based on the selection of the content item, while the user access rights are not associated with access to the content item, first output of the content item, via a user interface, at a first quality that is lower than an available second quality associated with access to the content item;
determine, based on one or more parameters associated with an access option for accessing the content item, a price of the access option;
receive, during the first output of the content item, based on data indicative of the price of the access option, data indicative of a selection, via the user interface, of the access option for accessing the content item;
cause, based on the selection of the access option, the user access rights to be associated with access to the content item; and
cause, based on the user access rights being associated with access to the content item, second output of the content item, via the user interface, at the second quality.

12. The apparatus of claim 11, wherein the processor-executable instructions, when executed by the one or more processors, further cause the apparatus to cause output of a list of content items at a user device, wherein the list is sorted based on one or more of a price point or a relevance.

13. The apparatus of claim 11, wherein the processor-executable instructions, when executed by the one or more processors, further cause the apparatus to:
determine, based on an access term of a pre-paid account associated with the user access rights, an available balance of the pre-paid account; and
send data indicative of the available balance of the pre-paid account.

14. The apparatus of claim 11, wherein the processor-executable instructions, when executed by the one or more processors, further cause the apparatus to:
determine, based on an access term of a pre-paid account associated with the user access rights, an available balance of the pre-paid account;
determine, based on the available balance being insufficient to access the content item, that the pre-paid account satisfies a threshold; and send data indicative of the pre-paid account having insufficient funds.

15. One or more non-transitory computer-readable media storing processor-executable instructions that, when executable by at least one processor, cause the at least one processor to:
receive, by a device, data indicative of a selection of a content item;
determine, based on the data indicative of the selection of the content item, that user access rights are not associated with access to the content item;
cause, based on the selection of the content item, while the user access rights are not associated with access to the content item, first output of the content item, via a user interface, at a first quality that is lower than an available second quality associated with access to the content item;
determine, based on one or more parameters associated with an access option for accessing the content item, a price of the access option;
receive, during the first output of the content item, based on data indicative of the price of the access option, data indicative of a selection, via the user interface, of the access option;
cause, based on the selection of the access option, the user access rights to be associated with access to the content item; and
cause, based on the user access rights being associated with access to the content item, second output of the content item, via the user interface, at the second quality.

16. The non-transitory computer-readable media of claim 15, wherein the one or more parameters comprise one or more of a type of content offering, a duration of access, a popularity of the content offering, a bandwidth availability, or a previous selection of the access option.

17. The non-transitory computer-readable media of claim 15, wherein the processor-executable instructions, when executed by the at least one processor, further cause the at least one processor to cause output of a list of content items at a user device, wherein the list is sorted based on one or more of a price point or a relevance.

18. The non-transitory computer-readable media of claim 15, wherein the processor-executable instructions, when executed by the at least one processor, further cause the at least one processor to:
determine, based on an access term of a pre-paid account associated with the user access rights, an available balance of the pre-paid account; and
send data indicative of the available balance of the pre-paid account.

19. The non-transitory computer-readable media of claim 15, wherein the processor-executable instructions, when executed by the at least one processor, further cause the at least one processor to:
determine, based on an access term of a pre-paid account associated with the user access rights, an available balance of the pre-paid account;
determine, based on the available balance being insufficient to access the content item, that the pre-paid account satisfies a threshold; and
send data indicative of the pre-paid account having insufficient funds.

20. The apparatus of claim 11, wherein the one or more parameters comprise one or more of a type of content offering, a duration of access, a popularity of the content offering, a bandwidth availability, or a previous selection of the access option.

* * * * *